No. 842,696. PATENTED JAN. 29, 1907.
G. PFEIFFER, JR.
WATER SUPPLY AND PURIFICATION SYSTEM.
APPLICATION FILED JUNE 1, 1906.

3 SHEETS—SHEET 1.

WITNESSES:
Hamilton D. Turner
Kate A. Beadle

INVENTOR
George Pfeiffer Jr
BY
Smith & Mazur
ATTORNEYS.

No. 842,696. PATENTED JAN. 29, 1907.
G. PFEIFFER, Jr.
WATER SUPPLY AND PURIFICATION SYSTEM.
APPLICATION FILED JUNE 1, 1906.

3 SHEETS—SHEET 2.

WITNESSES:
Hamilton T. Turner
Kate A. Beadle.

INVENTOR
George Pfeiffer Jr
BY
Smith & Mozier
ATTORNEYS

No. 842,696. PATENTED JAN. 29, 1907.
G. PFEIFFER, Jr.
WATER SUPPLY AND PURIFICATION SYSTEM.
APPLICATION FILED JUNE 1, 1906.
3 SHEETS—SHEET 3.
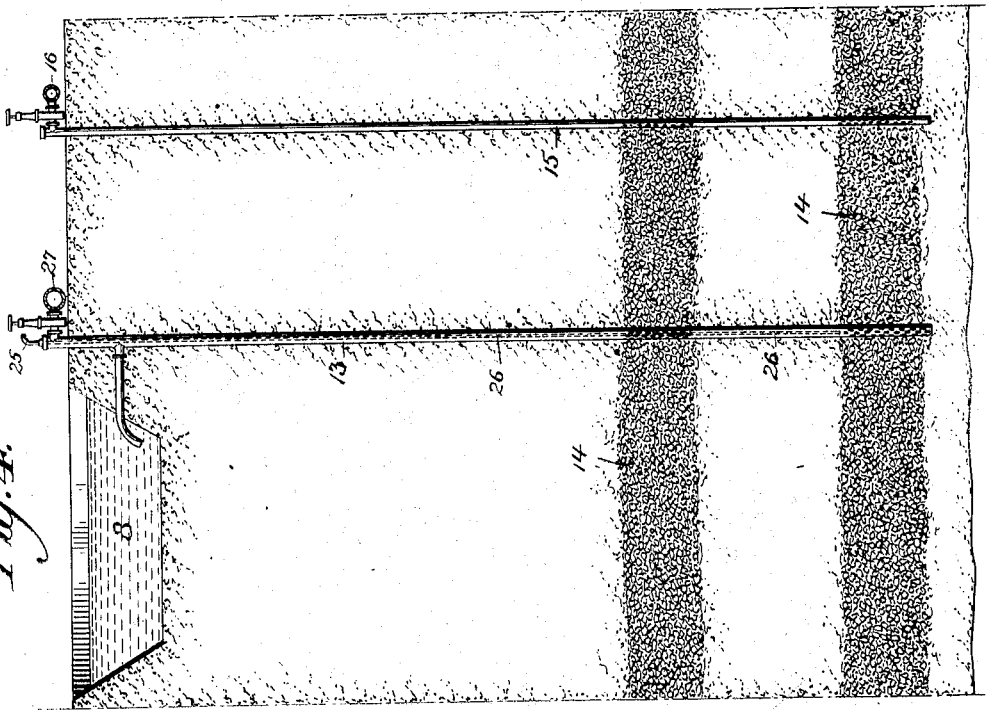
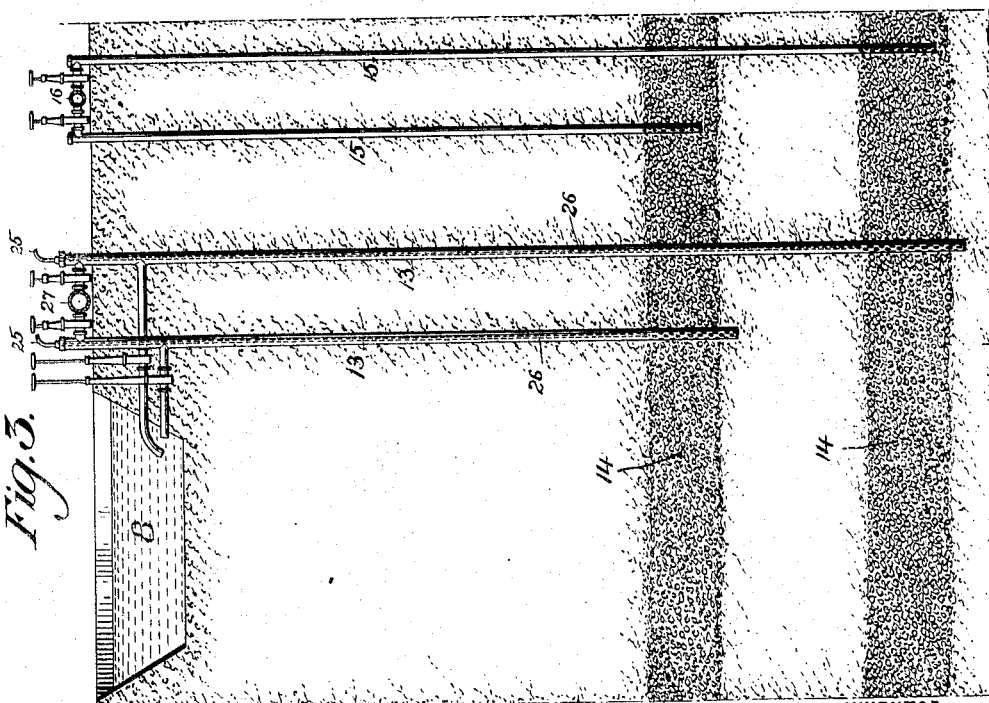
WITNESSES:
INVENTOR
George Pfeiffer Jr
BY
Smith & Mayer
ATTORNEYS.

UNITED STATES PATENT OFFICE.

GEORGE PFEIFFER, JR., OF BROWN MILLS, NEW JERSEY.

WATER SUPPLY AND PURIFICATION SYSTEM.

No. 842,696.     Specification of Letters Patent.     Patented Jan. 29, 1907.

Application filed June 1, 1906. Serial No. 319,706.

*To all whom it may concern:*

Be it known that I, GEORGE PFEIFFER, Jr., a citizen of the United States, residing in Brown Mills, New Jersey, have invented certain Improvements in Water Supply and Purification Systems, of which the following is a specification.

My invention relates to a system of water supply and purification in which the supply is derived mainly, if not wholly, from a surface stream whose water in its natural state is unfit for drinking purposes, but is purified and rendered potable by utilization of a natural water-bearing stratum or series of strata as a filtering medium.

One object of my invention is to prevent rapid fouling of the filtering medium, which I effect by a preliminary separation from the water-supply of a large percentage of the foreign matter held in suspension therein; and a further object is to effect the rapid and effective cleaning of the filtering medium when it has become foul. These objects I attain in the manner hereinafter set forth, reference being had to the accompanying drawings, in which—

Figure 1:
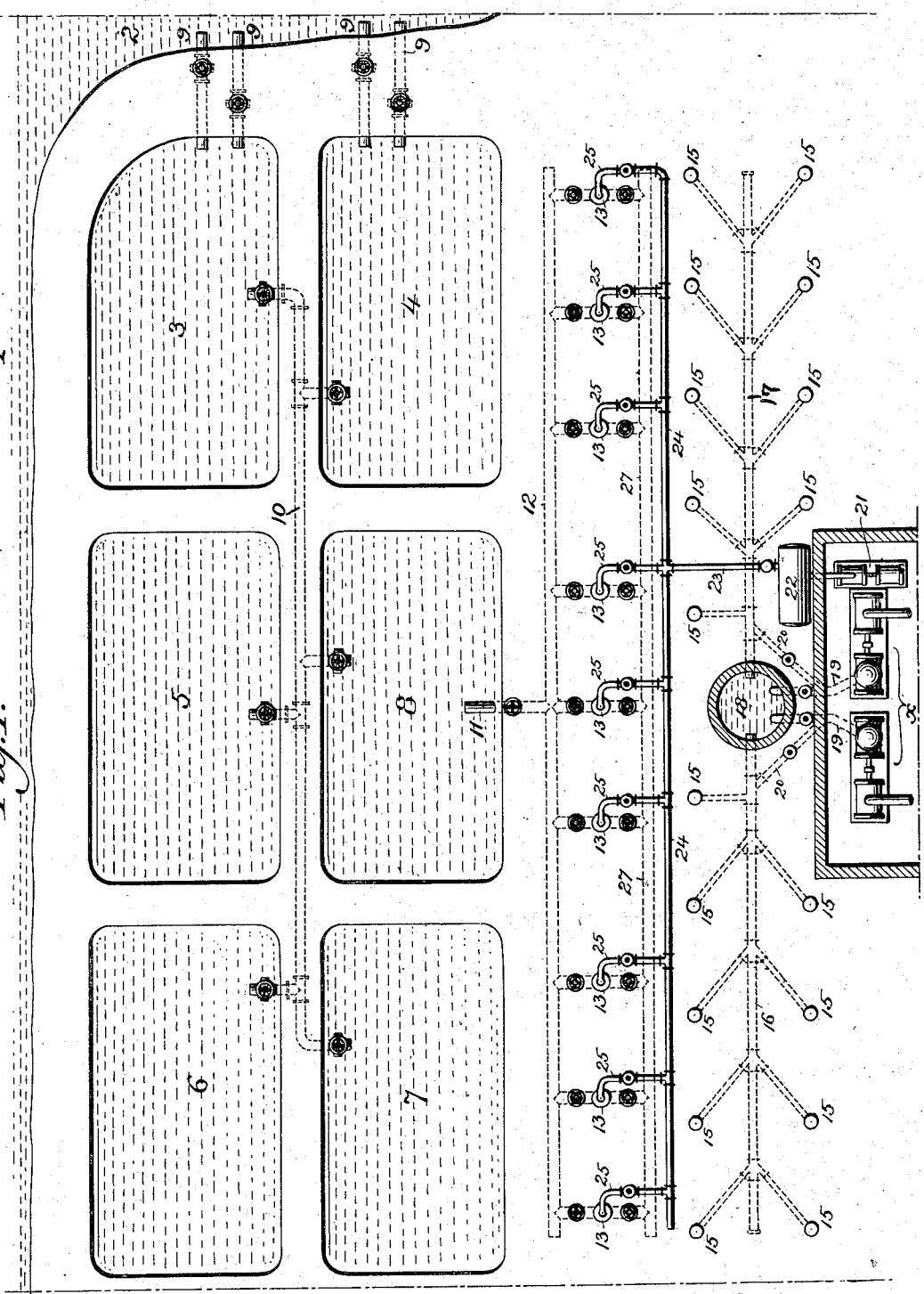
Figure 2:
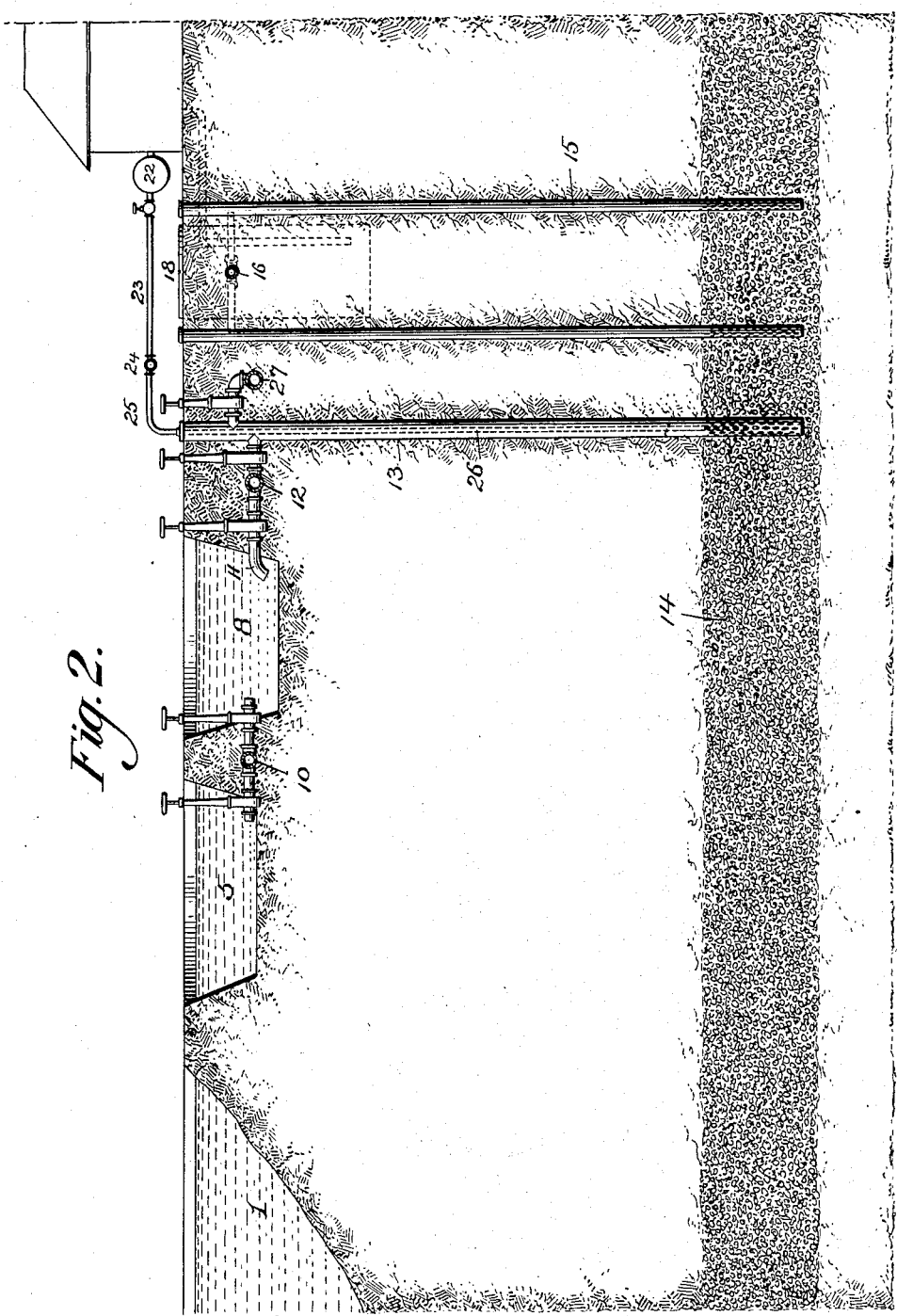

Figure 1 is a plan view showing in a diagrammatic way a water supply and purification plant in accordance with my invention. Fig. 2 is a transverse sectional view of the same; and Figs. 3 and 4 are sectional views illustrating other embodiments of my invention.

It has before been proposed to use a natural water-bearing stratum as a filter for a supply of surface water to wells communicating with said water-bearing stratum; but such a supply of surface water necessarily causes fouling of the filtering medium, and the difficulty of effecting a proper cleaning of the latter has heretofore proven to be an insuperable objection to the adoption of this method as a means of water-supply.

In carrying out my invention I provide one or more sedimentation basins or reservoirs, in which a large percentage of the foreign matter held in suspension in the water can be precipitated prior to conveying said water to the stratum or strata intended to serve as a filtering medium therefor, and I effect the cleaning of such filtering medium when necessary by the employment of a fluid under pressure, and preferably by the use of air, in the manner hereinafter set forth.

In the drawings, 1 represents a river or other stream or body of water, 2 a creek or other branch of the same, and 3, 4, 5, 6, 7, and 8 a series of sedimentation basins or reservoirs, preferably formed on the bank of the stream, although they may be located in any position which local conditions may suggest as the most appropriate, the water being carried to them through suitable pipes. As shown in the drawings, short pipes 9, suitably valved, are employed for carrying the water directly from the stream into the reservoirs 3 and 4, and each of these reservoirs is in communication with each of the other reservoirs of the series through a pipe 10, having suitably-valved branches whereby it can be placed in communication with each reservoir.

From the reservoir 8 a valved pipe 11 leads to a longitudinal main 12, which serves as a source of supply for a series of wells 13, the latter communicating at their lower ends with the natural water-bearing stratum 14, which is to serve as the filtering medium, each of the branches between the main 12 and the wells 13 being valved in order that communication between said main and any one or more of the wells may be established or cut off at will. Also communicating with the water-bearing stratum 14 are the usual Artesian wells 15, connected by suitable mains 16 and 17 with the pumping plant of the waterworks.

The connection between the pump-wells 15 and the pump may be modified in many different ways, depending upon the circumstances of any particular case. In the present instance I have shown the mains 16 and 17 as discharging into a pump-supply reservoir 18, which communicates through valved pipes 19 with the pumping-plant, valved branches 20 connecting the pipes 19 and the mains 16 and 17 in order to permit flow of water from the latter direct to the pumps $x$ when the use of the reservoir 18 is not desired. The pumping plant also comprises an air-compressor 21, and the reservoir 22 of said air-compressor communicates through a valved pipe 23 with an air-main 24, which is in communication through valved branches 25 with an air-pipe 26 in each of the wells 13, said air-pipe 26 extending from the top of the well almost to the bottom of the same.

When the plant is in operation, the water from the river or stream is let into the various basins or reservoirs 3, 4, 5, 6, and 7 and is permitted to remain in each basin until the greater portion of the impurities in mechanical suspension in the water have been precipitated to the bottom of said basin, the relatively clear water being then permitted to flow into the basin 8, which serves as a distributing-basin for the supply of the water to the distributing-main 12, the basin 8 being by preference somewhat deeper than the remaining basins in order that the latter may be completely drained, if desired, when it becomes necessary to clean the same. By the use of a series of sedimentation-basins the water may be let into the same in succession and permitted to remain therein for a period of time necessary to effect the desired precipitation of impurities contained in the water, one or more of the basins being thereby always available for the supply of the partially-purified water to the distributing-basin 8. From the distributing-main 12 the water is conveyed by all or any desired number of the wells 13 to the water-bearing stratum 14, or, if desired, the supply-wells 13 and pump-wells 15 may, as shown in Fig. 3, be of different depths, so as to communicate with a number of water-bearing strata in the event of a single stratum being of insufficient capacity to supply the necessary body of filtering material, or each of the wells 13 and 15 may communicate with two or more strata, as shown in Fig. 4.

As the flow of the water through the stratum 14 is horizontal, there is not the same tendency of the impurities contained in the water to pack and clog the filtering-body, as is the case when the filtering action is effected by vertical flow through a filtering-bed; but even although the water supplied to the filtering stratum is deprived in the first instance of a large portion of its impurities said filtering-stratum will in time become foul or clogged and will therefore fail to properly perform its intended function. When the filtering material adjacent to any one of the wells 13 is thus effected, I close the communication between said well and the distributing-main 12 and permit a flow of air into the well from the air-main 24 through the valved branch 25 and pipe 26. The pressure of the air causes it to find its way into and through the water-bearing stratum 14, adjoining the lower end of the well 13, and when the pressure is removed by closing the valve in the branch 25 and opening a valve in a branch communicating with the drain-pipe 27 at the top of the well the inrush of water to the well 13 from the stratum 14 carries with it the impurities that have collected in said stratum, which impurities are carried by the outflowing column of water into the drain-pipe and conveyed by the latter to any available place of deposit. These operations may be repeated indefinitely until the water-bearing stratum has resumed its normal purity, whereupon the communication between the drain-pipe and the well may be closed and water again permitted to flow into the well 13 from the distributing-main 12. When a single well 13 communicates with two or more strata 14, both or all of the latter may be cleaned at once in the manner described.

As an Artesian well pumping plant is very seldom operated continuously and to its full capacity during the entire period of twenty-four hours, my improved system provides for the replenishing or restocking of the water-bearing stratum 14 with water during the time that the pumping plant is not in operation or is slowed down, and the capacity of the supply-wells 13 need not, therefore, equal the full pumping capacity of the wells 15, since the water-bearing stratum 14, besides serving as a natural source of supply independent of the surface supply, serves as a storage-reservoir for such surface water as may be permitted to flow into it during the period of inaction or partial action of the pumps. For this reason I am in many cases enabled to supply a pumping plant of large capacity with water derived from a single water-bearing stratum at a relatively shallow depth instead of sinking the pumping-wells so as to tap different water-bearing strata or carrying them to an excessive depth in order to tap a stratum capable of supplying the necessary flow.

By the use of a number of supply-wells 13 and by a proper distribution of the same in respect to the pump-wells 15 I can provide any desired length of travel for the surface water through the filtering stratum 14 before it reaches the inlet end of a pump-well, while at the same time avoiding an excessive length of travel of the surface water through the filtering medium, with its attendant friction tending to diminish the effect of the hydrostatic column maintained in the well 13 in forcing the surface-water through the filtering stratum. It happens in many cases that the surface area available for the driving of wells is limited, although ample volumes of surface water are at hand, and my invention is especially applicable to such conditions and also where the natural supply of water derived from the water-bearing stratum or strata is strongly impregnated with foreign matters, such as salts of iron, magnesia, lime, or the like, which render the water unfit for drinking because of the unpleasant taste imparted to it, or are present in such quantity as to be injurious to health. In that case surface water may be supplied in such volume that the percentage of impurity in the water delivered by the pumps 15 will be reduced to the extent necessary to render said water both potable and wholesome.

While I prefer to use as a cleansing medium air or other elastic fluid under pressure, water under pressure may be used, if desired, a convenient way of accomplishing this result being to provide a valved connection between the upper end of each well 13 and the stand-pipe or water-tower of the pumping plant, and instead of using a single distributing-basin and a distributing-main for conveying the surface water to the wells 13 each of said wells may have direct connection with a distributing-basin, if desired, as shown in Fig. 3.

I claim—

1. In a water supply and purification system, the combination of a sedimentation-basin receiving its supply from a body of surface water, a well communicating at its upper end with said sedimentation-basin and at its lower end with a natural water-bearing stratum, and a pump-well likewise communicating with said water-bearing stratum at a point so remote from the supply-well that the water-bearing stratum serves as a filter for the water flowing from one well to the other.

2. In a water supply and purification system, the combination of a plurality of sedimentation-basins receiving their supply from a body of surface water, a well communicating at its lower end with a natural water-bearing stratum, a pump-well likewise communicating with said stratum, and means whereby the first well can receive its supply of water from one of the sedimentation-basins without disturbing the water in the other basin or basins.

3. In a water supply and purification system, the combination of a series of sedimentation-basins receiving their supply from a body of surface water, a distributing-basin having independent connection with each of the sedimentation-basins of the series, a well communicating at its upper end with said distributing-basin and at the lower end with a natural water-bearing stratum, and a pump-well likewise communicating with said water-bearing stratum.

4. In a water supply and purification system, the combination of a series of sedimentation-basins receiving their supply from a body of surface water, a distributing-basin deeper than said sedimentation-basins and having independent connection with each, a well, communicating at its upper end with said distributing-basin and at the lower end with a natural water-bearing stratum, and a pump-well likewise communicating with said water-bearing stratum.

5. In a water supply and purification system, the combination of a well receiving its supply from a body of surface water, and communicating at its lower end with a natural water-bearing stratum, a pump-well likewise communicating with said water-bearing stratum, and means for supplying fluid under pressure to the first well and for releasing said pressure, to cause a sudden inrush of water from the water-bearing stratum into the well for cleansing purposes.

6. In a water supply and purification system, the combination of a well receiving its supply from a body of surface water, and communicating at its lower end with a natural water-bearing stratum, a pump-well likewise communicating with said water-bearing stratum, and means for supplying air or other elastic fluid under pressure to the first well and for releasing said pressure, to cause a sudden inrush of water from the water-bearing stratum into the well for cleansing purposes.

7. In a water supply and purification system, the combination of a well receiving its supply from a body of surface water and communicating at its lower end with a natural water-bearing stratum, a pump-well likewise communicating with said water-bearing stratum, means for supplying fluid under pressure to the first well and for releasing said pressure to cause a sudden inrush of water from the water-bearing stratum into the well for cleansing purposes, and a drain-pipe having valved communication with the upper end of the well, whereby it can receive said cleansing flow.

8. In a water supply and purification system, the combination of a series of pump-wells communicating with a natural water-bearing stratum, and a series of wells likewise communicating with said water-bearing stratum and also in communication with a body of surface water, so as to deliver a supply of the latter to the water-bearing stratum, said supply-wells being so disposed in reference to the pump-wells that each supply-well furnishes water to the pump-wells adjacent thereto.

9. In a water supply and purification system, the combination of a plurality of pump-wells, each communicating with a natural water-bearing stratum, a plurality of supply-wells likewise communicating with said water-bearing stratum and with a body of surface water, a reservoir of fluid under pressure, a main supplied thereby, and a valved communication between said main and each of the supply-wells.

10. In a water supply and purification system, the combination of a plurality of pump-wells, each communicating with a natural water-bearing stratum, a plurality of supply-wells likewise communicating with said water-bearing stratum and with a body of surface water, a reservoir of fluid under pressure, a main supplied thereby, a valved communication between said main and each of the supply-wells, and a valved communication between the upper portion of each of said supply-wells and a drain-pipe.

11. In a water supply and purification system, the combination of a plurality of pump-wells, each communicating with a natural water-bearing stratum, a plurality of sedimentation-basins receiving their supply from a body of surface water, a distributing-basin in communication with said sedimentation-basins, a distributing-main in communication with said distributing-basin, and a series of supply-wells, each providing a communication between said distributing-main and the water-bearing stratum with which the pump-wells communicate.

12. In a water supply and purification system, the combination of a well, communicating at its lower end with a plurality of water-bearing strata, and at its upper end with a body of surface water, and one or more pump-wells, also communicating with said water-bearing strata.

In testimony whereof I have signed my name to this specification in the presence of two subscribing witnesses.

GEORGE PFEIFFER, Jr.

Witnesses:
HAMILTON D. TURNER,
KATE A. BEADLE.